3,158,529
POLYURETHANE SANDWICH STRUCTURES
Paul Robitschek, Granville, Ohio, and Stephen M. Creighton, Niagara Falls, and Raymond R. Hindersinn, Lewiston, N.Y., assignors to Hooker Chemical Corporation, Niagara Falls, N.Y., a corporation of New York
No Drawing. Filed Mar. 4, 1963, Ser. No. 262,329
13 Claims. (Cl. 161—161)

This invention relates to lightweight, fire-resistant, sandwich structures containing fire-resistant foamed or cellular plastic core material. By the term "sandwich" is meant a foamed material encased or covered on the top and bottom sides with a protective skin.

This application is a continuation-in-part of copending application Ser. No. 811,539, filed May 7, 1959, now abandoned.

The rigid plastic foams have found wide and varied use in industry. For instance, they can be used as core materials between skins of many and varied compositions. In aircraft construction, the foam can be enclosed between aluminum or fiber glass reinforced plastic skins to form an assembly which is rigid, strong and yet remarkably light. Because of their excellent electrical properties polyurethane foams enclosed by fiber glass reinforced plastic skins are also useful in the construction of radomes. Large panels having a low-density core contained between lightweight outer skins can be employed as complete structural units for wall or ceiling panels in fabrication of home and industrial buildings and structures. By suitable selection of the plastic core and outer skins these panels can be fire-retardant, excellent insulators, resistant to penetration or attack by moisture and fungi, and have a large strength to weight ratio so desirable in the construction industry.

The sandwich-type structures known heretofore have certain of these desirable properties at least to some degree, but they generally have several serious drawbacks. They are quite flammable and burn rapidly and freely when once ignited. Furthermore, during the foaming process large amounts of heat are liberated which may be so excessive that the interior of the foamed sections may discolor or even char. Also, because of the high degree of heat liberation during preparation of the foam, the mixing procedure requires close temperature control. It is very apparent that the flammability of plastic foams is a serious obstacle to their use for structural and building purposes as well as for other purposes where safety and permanence are also of importance. Many of the rigid polyurethane foams known to the art are also susceptible to degradation by the action of water, particularly at elevated temperatures.

The prior art teaches that polyurethane foams can be rendered less flammable by the incorporation of certain plasticizing substances which impart some degree of non-flammability to the polyurethane foams. Among such plasticizing substances are the various phosphate or phosphonate esters, or chlorinated compounds. However, such plasticizing substances are additives which are not chemically combined with or in the polyurethane plastic and are progressively lost from the plastic by evaporation, leaching, migration, etc. Consequently, such foams do not have a permanently reduced flammability. Furthermore, the plasticizing additive affects the physical properties of the foam, particularly with regard to high temperature strength. The progressive addition of the plasticizer or additive improves the non-flammability, but generally lowers the high temperature strength.

To prepare a sandwich structure from rigid plastic foams as described in the prior art, a complex series of steps is often required. First, slab rock must be produced of the desired rough dimensions. Second, this slab must be subjected to finishing operations to obtain the desired surface and dimensions for subsequent processing. Third, the surfaces of this core material and of the outer skins must be coated with a suitable adhesive. Fourth, the structure must be assembled and the adhesive cured. Such a procedure is necessarily costly making the resultant product non-competitive in price with presently used construction materials.

It is an object of the present invention to provide a lightweight, fire-resistant sandwich structure, containing polyurethane core material. It is a further object to provide a sandwich structure of controlled dimensions requiring no further fabricating after the foaming process. It is a further object of this invention to provide a sandwich structure which develops a great deal of adhesion during the foaming process between the foam core and the protective skin, and requires no extraneous adhesive. It is yet another object of this invention to provide a sandwich structure possessing a superior effectiveness as a fire wall or as a fire-resistant heat barrier. It is a further object of the invention to provide sandwich structures with outstanding impact resistance, shear strength and stiffness factor which are well adapted for use as self-supporting building panels. Further objects and advantages of this invention will appear herein.

It has been found that a lightweight sandwich structure achieving the foregoing objects can be prepared by utilizing as the core material, the foamed reaction product of: (A) a polyester resin comprised of an adduct of hexahalocyclopentadiene, wherein the halogen is selected from the group consisting of chlorine, fluorine, bromine and mixtures thereof, and a dienophile having a plurality of functional groups capable of esterification; (B) an organic polyisocyanate; and (C) a foaming agent; and as the skin material, a thermoset polyester resin comprising the reaction product of (D) an unsaturated polyester resin comprised of an adduct of hexahalocyclopentadiene, wherein the halogen is selected from the group consisting of chlorine, fluorine, bromine and mixtures thereof, and a dienophile having a plurality of functional groups capable of esterification; and (E) a vinylidene monomer.

By using the foregoing combination of polyurethane foam core and polyester skin, both of which contain an adduct of hexahalocyclopentadiene, a sandwich structure is obtained that has superior properties. The greatest enhancement of properties results from using two such polyester skins. In the interest of economy it is sometimes desirable to prepare the sandwich panel with one polyester skin and one skin of a less expensive material such as plywood, lightweight metal or commercial "wall board." This procedure is particularly desirable in manufacturing exterior wall panels for building construction in which the polyester resin skin serves as the exterior, weather-resistant, fire-resistant surface and the less expensive skin is used on the inside surface which is intended to merely serve as the base for a decorative coating of some type. Other materials can also be used as the second skin, such as ceramics, fiberglass, and plastics other than the polyester resins of the invention.

THE POLYURETHANE FOAM CORE

The halogen can be incorporated into the polyester resin as the acid adduct of hexahalocyclopentadiene or the alcohol adduct of hexahalocyclopentadiene. Copending application Ser. No. 623,795, filed November 23, 1956, discloses and claims fire-resistant cellular foams produced by utilizing a foamable mixture which comprises: (A) a polyetser resin comprised of (1) an adduct of hexahalocyclopentadiene and a polycarboxylic compound containing aliphatic carbon-to-carbon unsaturation, and (2) a polyhydric alcohol containing at least three hydroxyl groups; (B) an organic polyisocyanate; and (C) a foaming agent. The polyester is provided in the liquid state and the polyisocyanate and the foaming agent are added and mixing is continued until a homogeneous mixture is obtained. The temperature is then raised if necessary to carry out the foaming process, and the foam is subsequently cured.

As aforesaid, the fire-resistant cellular foams can also be produced by utilizing a foaming mixture which comprises an alcohol adduct of hexahalocyclopentadiene such as: (A) a polyester comprised of (1) an adduct of hexahalocyclopentadiene and a polyhydric alcohol containing aliphatic carbon-to-carbon unsaturation, (2) a polycarboxylic compound, and (3) a polyhydric alcohol containing at least three hydroxyl groups; (B) an organic polyisocyanate, and (C) a foaming agent. Copending application Ser. No. 764,772, filed October 2, 1958, now abandoned, discloses and claims such foamable mixtures. The hexahalocyclopentadiene-alcohol adduct based polyester thus produced is brought to the liquid state by heating, a with or without a plasticizer, until the desired viscosity is obtained. The polyisocyanate and the foaming agent are then added and mixing is continued until a homogeneous mixture is obtained. Foaming is effected at an elevated temperature and curing is also effected at an elevated temperature, producing a rigid foam having excellent properties at elevated temperatures.

Another method of making fire-resistant cellular foams based upon adducts of hexahalocyclopentadiene which are useful in making sandwich structures embraced within the teaching of this invention is disclosed in U.S. Patent 3,058,924. This patent discloses and claims foamable compositions comprising (A) a polyester resin comprised of the reaction product of (1) an adduct of a hexahalocyclopentadiene and a monocarboxylic compound containing aliphatic carbon-to-carbon unsaturation, (2) a polyhydric alcohol containing at least three hydroxy groups; and (3) a polycarboxylic compound; (B) an organic polyisocyanate; and (C) a foaming agent.

The preferred polycarboxylic adduct when proceeding to make the sandwich structures of this invention is 1,4,5,6,7,7 - hexachlorobicyclo - (2.2.1)-5-heptene-2,3-dicarboxylic acid (commonly known as chlorendic acid), but other polycarboxylic adducts of hexahalocyclopentadiene can be used. Among these are the following:

1,4,5,6,7,7-hexachlorobicyclo-(2.2.1)-5- heptene-
2,3-dicraboxylic anhydride (chlorendic anhydride);
1,4,5,6,7,7-hexachloro-2-methyl-bicyclo-(2.2.1)-
5-heptene-2,3-dicarboxylic anhydride;
the mono-ethyl ester of 1,4,5,6,7,7-hexachlorobicyclo-
(2.2.1)-5-heptene-2,3,-dicarboxylic acid;
1,4,5,6-tetrachloro-7,7-difluorobicyclo-(2.2.1)-
5-heptene-2,3-dicarboxylic acid;
1,4,5,6-tetrachloro-7,7-dibromobicyclo-(2.2.1)-
5-heptene-2,3-dicarboxylic acid;
1,4,5,6,7,7-hexachlorobicyclo-(2.2.1)-5-heptene-
2-acetic-2-carboxylic anhydride; and
1,4,5,6,7,7-hexachlorobicyclo-(2.2.1)-5-heptene-
2,3-dicarbonyl chloride.

The polycarboxylic compounds suitable for adduction with the hexahalocyclopentadiene are the acids, anhydrides, acid halides are acid esters.

Additionally, a saturated aliphatic dicarboxylic acid such as adipic acid can be used in conjunction with the halogen-containing dicarboxylic acid to obtain modified properties. Other suitable acids which can be used to obtain modified properties are oxalic, malonic, succinic, glutaric, pimelic, suberic, azelaic, sebacic, etc. For certain purposes unsaturated acids such as maleic, fumaric, citraconic, itaconic, aconitic, etc., can also be used.

As aforesaid a second method of making the polyurethane foams of this invention comprises incorporating combined halogen into the polyester in the form of an adduct of hexahalocyclopentadiene with a polyhydric alcohol containing olefinic or carbon-to-carbon unsaturation. Among the adducts which can be so used are:

2,3-dimethylol-1,4,5,6,7,7-hexachlorobicyclo-
(2.2.1)-5-heptene;
2,3-dimethylol-1,4,5,6,7,7-hexabromobicyclo-
(2.2.1)-5-heptene;
3-(1,4,5,6-tetrachloro-7,7-difluorobicyclo-(2.2.1)-
5-heptene-2-yl)-methoxy-1,2-propane diol; and
3-(1,4,5,6,7,7-hexachloro-(2.2.1)-5-heptene-
2-yl)-methoxy-1,2-propane diol.

The preparation of these compounds is disclosed in U.S. Patent 3,007,958. The combined halogen-containing glycol can then be condensed with a polycarboxylic acid, and an additional polyhydric alcohol containing at least three functional groups in order to provide sufficient hydroxyl groups to enable the polyisocyanate compound to cross-link the polyester formed.

When making foams based upon monocarboxylic adducts of hexahalocyclopentadiene, typical adducts which can be employed are:

1,4,5,6,7,7-hexachlorobicyclo-(2.2.1)-5-heptene-
2-carboxylic acid;
2-methyl-1,4,5,6,7,7-hexachlorobicyclo-(2.2.1)-
5-heptene-2-carboxylic acid;
methyl-1,4,5,6,7,7-hexachlorobicyclo-(2.2.1)-
5-heptene-2-carboxylate;
methyl-2-methyl-1,4,5,6,7,7-hexachlorobicyclo-
(2.2.1)-5-heptene-2-carboxylate; and
ethyl-1,4,5,6,7,7-hexachlorobicyclo-(2.2.1)-
5-heptene-2-carboxylate.

Polycarboxylic compounds suitable for reaction with the alcohol adducts of hexahalocyclopentadiene and with the monocarboxylic adducts of hexahalocyclopentadiene are any of the aliphatic dicarboxylic acids mentioned hereinbefore, as well as phthalic acid; isophthalic acid; terephthalic acid; 1, 4- cyclohexadiene - 1,2-dicarboxylic acid; itaconic acid; citriconic acid, and the corresponding anhydrides, halides, esters; such as phthalic anhydride, phathaloyl chloride and the methyl ester of phthaloyl chloride, respectively.

To obtain a satisfactory rigid foam for making the sandwich structures based upon a polycarboxylic adduct of hexahalocyclopentadiene, at least a portion of the total polyhydric alcohol component should consist of a polyhydric alcohol containing at least three hydroxyl groups. This is necessary to provide a means for cross-linking the polyester. When a more rigid finally-cured structure is desired, the whole alcohol component can be made up of a tri-functional alcohol such as glycerol. Where a less rigid final product is desired, a di-functional polyhydric alcohol such as ethylene glycol or 1,4-butane diol can be utilized as that part of the polyhydric alcohol component. Other glycols such as diethylene glycol, propylene glycol, etc. can also be used. Among the other alcohols which may be used are glycerol, hexanetriol, butanetriol, trimethylol propane, trimethylol ethane, pentaerythritol, triethylene glycol, butylene glycol, 1,2-dipropylene glycol, 1,3-dipropylene glycol and the like.

A particularly desirable alkyd resin for use in this invention is prepared by reacting the polycarboxylic compound and the polyhydric alcohol, at least one of which is an adduct of hexahalocyclopentadiene as defined hereinbefore, in a ratio to provide more than one hydroxyl group for each carboxyl group. The reaction of the polycarboxylic compound and the polyhydric alcohol components is continued until a resin is produced having an acid number in the range of 20 to 90, and then this product is reacted with a monomeric monoepoxide to provide an acid number in the range desired for the particular application involved. Generally, for the polyurethane foams, the desired final acid number is less than 20, preferably less than 10, and still more preferably less than about 2. The preferred reaction temperature is in the range from 150 to 200 degrees centigrade, but higher and lower temperatures can be used, for example from 125 to 225 degrees centigrade. The hydroxyl number of the resulting resin generally falls in the range of about 200 to 800, usually from about 300 to 600. The monomeric epoxides are generally preferred in preparing this type of composition. Examples of monoepoxides that can be employed are ethylene oxide, propylene oxide, butylene oxide, isobutylene oxide, cyclohexene oxide, 2,3-epoxyhexane, 3-ethyl-2,3-epoxyoctane, epichlorohydrin, epibromohydrin, styrene oxide, glycidol, decylene oxide, triphenyl glycidyl silane, allyl glycidyl ether, methyl glycidyl ether, phenyl glycidyl ether, butyl glycidyl sulfide, glycidyl methyl sulfone, glycidyl methylacrylate, glycidyl acrylate and glycidyl benzoate.

A large number of various organic polyisocyanates can be used. The aromatic polyisocyanates are more reactive and less toxic than the aliphatic members. Consequently, the aromatic compounds are preferred in the present invention. The compounds which are at present most readily available commercially are 2,4-tolylene diisocyanate; 2,6-tolylene diisocyanate; and crude commercial mixtures thereof. However, others can be used, among which are methylene bis(4-phenylisocyanate); 3,3′ - bitolylene - 4,4′ - diisocyanate; 3,3′ - dimethoxy-4,4′-biphenylene diisocyanate; 4,4′,4′′-triphenylmethane triisocyanate; 1,5-naphthyl diisocyanate; polymethylene polyphenylisocyanate, and mixtures thereof. Higher isocyanates are provided by the liquid products of (1) diisocyanates and (2) polyols or polyamines. In addition, isothiocyanates can be used. Also contemplated are the many impure or crude polyisocyanates that are commercially available, such as crude mixtures of methylene bis(4-phenylisocyanate).

It is also contemplated to employ polyurethane compositions wherein at least a portion of the adduct of hexahalocyclopentadiene is first reacted with an organic polyisocyanate to form a prepolymer, and the resulting isocyanato-terminated prepolymer is then reacted with a hydroxyl containing polymeric material in the presence of a foaming agent to produce the polyurethane foam. Such compositions are disclosed and claimed in U.S. Patents 3,055,849 and 3,055,850, issued September 25, 1962.

Conventional catalysts can be used in producing the polyurethane compositions. The catalyst employed can be any of the known conventional catalysts for isocyanate reactions, such as tertiary amines, for example, triethylamine, N-methyl morpholine, triethanolamine, etc., or antimony compounds such as antimony caprylate, antimony naphthenate, or antimonous chloride. In addition, tin compounds can be employed such as dibutyltin dilaurate, tri-n-octyltin oxide, hexabutylditin, tributyltin dilaurate, tributyltin phosphate, or stannic chloride. Phosphorus acids, such as the alkyl acid phosphates, can also be employed. Rigid or flexible polyurethane foams are thereby obtained. The rigid polyurethane foams utilize a highly branched hydroxyl rich polyester or polyether having a hydroxyl number of between about two hundred and nine hundred and fifty. The flexible polyurethane foams utilize a linear relatively hydroxyl poor polyester or polyether having a hydroxyl number of between about thirty and one hundred. If a polyester or polyether with a hydroxyl number between about one hundred and two hundred is employed, a semi-rigid polyurethane foam is usually obtained.

Any foaming agent commonly used in the art can be employed. Foaming agents in this art are generally those materials that are capable of liberating gaseous products when heated, or when reacted with an isocyanate. Preferably foaming is accomplished by introducing a low boiling liquid into the catalyzed resin. The heat of reaction is then sufficient to expand the mixture to a foam stable enough to retain its shape until the resin gels. Suitable liquids are the fluorochlorocarbons boiling in the range of twenty to fifty degrees centigrade, and mixtures thereof, for example, trichlorofluoromethane, trichlorotrifluoroethane, dichloromonofluoromethane, monochloroethane, monochloromonofluoroethane, difluoromonochloroethane, and difluorodichloroethane.

Another foaming system that is suitable for carrying out the foaming reaction at an elevated temperature is found in United States Patent 2,865,869, which discloses and claims the use of tertiary alcohols in the presence of strong, concentrated acid catalysts. Examples of tertiary alcohols include: tertiary amyl alcohol; tertiary butyl alcohol; 2-methyl-3-butyn-2-ol; 1-methyl-1-phenylethanol; and 1,1,2,2-tetraphenylethanol, etc. Examples of catalysts include: sulfuric acid; phosphoric acid; sulfonic acid; and aluminum chloride; etc. In addition, various secondary alcohols and glycols may be used as: 1-phenyl-1,2-ethanediol; 2-butanol; etc. Generally, secondary alcohols should be used with strong concentrated acid catalysts as above; however, certain secondary alcohols may be used without the acid catalyst, e.g., acetaldol, chloral hydrate, etc. Other foaming agents that may be used include the following: polycarboxylic acids, polycarboxylic acid anhydrides, dimethylol ureas, polymethylol phenols, formic acid and tetrahydroxy methylphosphonium chloride. In addition, mixtures of the above foaming agents can be employed.

The proportion of the various ingredients of the foaming composition of the present invention can be varied over a wide range to obtain various properties. For instance, if a foam having a high degree of fire-resistance is desired, a larger halogen content must be employed. Foams containing 25 percent or more halogen by weight are very highly fire-resistant. Foams which contain 4 percent or less combined halogen by weight have a lower degree of fire-resistance. When varying percentages of halogen are used, the foam will have varying degrees of fire-resistance, the degree being generally in proportion to the amount of halogen incorporated into the foam.

The amount of foaming agent used is not critical but will be dictated by the type of foam desired. If a very dense foam is desired, only a small amount need be used. If a very light foam is desired, a maximum amount can be used. The amount used will also depend upon the type of foaming agent. When using a foaming agent comprised of a tertiary alcohol such as tertiary amyl alcohol, it has been found that 1.5 grams is sufficient to foam a total ingredient mixture of 35 grams to produce a fire-resistant foam having a density of 2.0 to 2.5 pounds per cubic foot. Additional foaming agent can be used if desired.

The polyisocyanate concentration can be varied from about 30 to 130 mole percent with respect to the sum of the polyester and foaming agent, based on the number of hydroxyl and carboxyl groups in each. The foams obtained with the higher concentration are resilient, but the resiliency decreases with increasing amount of isocyanate above 100 percent. The foams made with the 30 mole percent of isocyanate are very brittle. The preferred range for the foam of the present invention is about 85 to about 115 mole percent of isocyanato groups with respect to the total number of hydroxyl and carboxyl groups.

Various additives can be incorporated to provide different properties. For instance, antimony oxide or a phosphorus acid, such as an alkyl acid phosphate, can be used to improve fire-resistance; fillers, such as clay, calcium sulfate or ammonium phosphate can be added to lower cost and to improve density and fire-resistance; ingredients such as dyes may be added for color; and fibrous glass, asbestos, or synthetic fibers may be added for strength.

It is also within the scope of the invention to mix with the combined halogen polyester resin another hydroxyl containing polymeric material that can be either a polyester comprised of the reaction product of a polycarboxylic compound and polyhydric alcohol, or a polyether comprised of the reaction product of a 1,2-monoepoxide, such as propylene oxide, and a polycarboxylic acid, a polyhydric alcohol or a polyphenolic compound such as a phenol-formaldehyde resin. The polycarboxylic acids, polyhydric alcohols, and epoxides can be any of such compounds listed hereinbefore.

THE POLYESTER SKIN

As aforesaid, at least one skin of the sandwich structure of the invention comprises a thermoset polyester resin containing an adduct of hexahalocyclopentadiene. Such a resin comprises the reaction product of (D) a polymerizable, linear polyester resin, comprised of the reaction product of a polycarboxylic acid and a polyhydric alcohol, said resin having olefinic copolymerizable unsaturation; and (E) a vinylidene monomer; a component of said thermoset polyester resin containing an adduct of hexahalocyclopentadiene wherein the halogen is selected from the group consisting of fluorine, chlorine, bromine and mixtures thereof. The hexahalocyclopentadiene is preferably adducted with a compound selected from the group consisting of a polycarboxylic compound containing aliphatic carbon-to-carbon unsaturation and a polyhydric alcohol containing aliphatic carbon-to-carbon unsaturation.

The preferred unsaturated polyesters are the reaction products of (1) an adduct of hexahalocyclopentadiene and a polycarboxylic compound containing aliphatic carbon-to-carbon unsaturation, (2) a polycarboxylic compound containing aliphatic carbon-to-carbon unsaturation and (3) a polyhydric alcohol. Such a product is disclosed and claimed in U.S. Patent 2,779,701, issued January 29, 1957. Other methods of incorporating either a polycarboxylic or polyhydric alcohol adduct of hexahalocyclopentadiene include: (a) the reaction of (1) a polycarboxylic adduct of hexahalocyclopentadiene and (2) an unsaturated polyhydric alcohol containing aliphatic carbon-to-carbon unsaturation, disclosed and claimed in U.S. Patent 2,863,794, issued December 9, 1958; (b) the reaction of (1) an adduct of hexahalocyclopentadiene and a polyhydric alcohol containing aliphatic carbon-to-carbon unsaturation and (2) a polycarboxylic compound containing aliphatic carbon-to-carbon unsaturation, disclosed and claimed in U.S. Patent 2,779,700, issued January 29, 1957; and (c) the reaction of (1) a polyhydric alcohol adduct of hexahalocylopentadiene with (2) another alcohol containing aliphatic carbon-to-carbon unsaturation and (3) a polycarboxylic acid disclosed and claimed in U.S. Patent 2,863,795, issued December 6, 1958. An alternate method for incorporating an adduct of hexahalocyclopentadiene into a polyester resin involves reacting an unsaturated polyester resin with a copolymerizable compound containing an adduct of hexahalocyclopentadiene, such as disclosed and claimed in U.S. Patent 2,783,215, issued February 26, 1957. The polyester resins containing the polycarboxylic and polyhydric alcohol adducts of hexahalocyclopentadiene can be modified by incorporating therein saturated carboxylic acids and anhydrides, as disclosed and claimed in U.S. Patent 2,890,144, issued June 9, 1959, and U.S. Patent 2,898,256, issued August 4, 1959. When used in this specification, the term polycarboxylic compound refers to the polycarboxylic acids, acid anhydrides, acid halides and acid esters.

The polycarboxylic and polyhydric adducts of hexahalocyclopentadiene suitable for use in preparing the unsaturated polyester resins are the polycarboxylic and polyhydric adducts of hexahalocyclopentadiene disclosed hereinbefore.

A variety of unsaturated acids, acid halides, acid anhydrides, and acid esters which contain aliphatic carbon-to-carbon unsaturation can be used in either the preparation of the polycarboxylic adducts of hexahalocyclopentadiene or to provide the unsaturation in the linear polyester molecules. The polycarboxylic acids and the corresponding acid halides, esters, anhydrides, and acid esters can include maleic, chloromaleic, ethylmaleic, itaconic, citraconic, zeronic, pyrocinchoninic and acetylene dicarboxylic, either alone or in mixtures.

Illustrative of the unsaturated polyhydric alcohols which contain aliphatic carbon-to-carbon unsaturation and which can be used either in preparing the adducts of hexahalocyclopentadiene or in providing the unsaturation in the linear polyester molecules are compounds such as butene diol, pentene diol, the unsaturated hydroxy ethers such as allyl or vinyl glycerol ethers, allyl or vinyl pentaerythritol ethers and the like.

The saturated polycarboxylic compounds useful in the preparation of the polyesters can be aliphatic, cycloaliphatic, aromatic or heterocyclic. Illustrative of these polycarboxylic acids, acid halides, acid anhydrides and acid esters include phthalic, isophthalic, terephthalic, tetrachlorophthalic, adipic, succinic, and mixtures thereof.

Suitable saturated polyhydric alcohols for use in the preparation of the polyester resins include ethylene glycol, diethylene glycol, propylene glycol, dipropylene glycol, butane diol, pentane diol, hexane diol, glycerol, mannitol, sorbitol, and mixtures thereof.

The temperature for the reaction between polyhydric alcohols and polybasic acids ranges from about one hundred to two hundred degrees centigrade, although higher or lower temperatures can be used. Esterification catalysts such as para-toluene sulfonic acid, benzene sulfonic acid, beta-naphthalene sulfonic acid and the like, or amines such as pyridine, triethyl amine, quinoline and the like can be added to the reaction mixture. The proportion of polyhydric alcohol is approximately controlled by the total mol proportion of acids in the esterification reaction mixture. It is also preferred to react the polyhydric alcohols and polybasic acids in roughly equimolar proportion, however, either the acids or alcohols can be used in substantial excess, if it is desired to form a low molecular weight polyester resin.

A variety of ethylenically unsaturated monomers can be used for curing or cross-linking the ethylenically unsaturated polyesters. It is generally preferred that addition polymerization be practiced since no by-product ammonia or water is formed, and the problems resulting therefrom are not experienced. The monomers useful in curing the thermoplastic unsaturated polymers include vinylic compounds or mixtures thereof capable of cross-linking ethylenically unsaturated polymer chains at their points of unsaturation. Usually they contain the reactive groups $H_2C{=}C{=}$. Specific examples include styrene, chlorostyrenes, methyl styrenes such as alpha methyl styrene, p-methyl styrene, divinyl benzene, indene, unsaturated esters such as: methyl methacrylate, methyl acrylate, allyl acetate, diallyl phthalate, diallyl succinate, diallyl adipate, diallyl sebacate, diethylene glycol bis(allyl carbonate), triallyl phosphate and other allyl esters, and vinyl toluene, diallyl chlorendate, diallyl tetrachlorophthalate, the lower aliphatic esters other than methyl of methacrylic and acrylic acids, ethylene glycol diacrylate, dimethacrylate, diethacrylate, etc. The monomer can be admixed in the polymer in an amount sufficient to produce a thermoset polymer and the admixture heated to an elevated temperature in the presence of a suitable catalyst to cross-link or cure the polymer. With proper catalyst systems such as cobalt naphthenate and methylethyl ketone peroxide, room temperature cures are obtained.

As disclosed hereinbefore, the adduct of hexahalocyclopentadiene can be added in the cross-linking agent. Among such cross-linking agents which can be used for this purpose are the following: diallyl-1,4,5,6,7,7-hexachlorobicyclo-(2.2.1)-5-heptene-2,3-dicarboxylate; diallyl-1,4,5,6,7,7-hexachloro-2-methylbicyclo-(2.2.1)-5-heptene- 2,3-dicarboxylate; diallyl-1,2,4,5,6,7,7-heptachlorobicyclo-(2.2.1)-5-heptene-2,3-dicarboxylate; and triallyl-1,4,5,6,7,7-hexachlorobicyclo-(2.2.1)-5-heptene-2-acetate-2,3-dicarboxylate. These compounds can be prepared by reacting hexachloropentadiene with the indicated dicarboxylic acid and esterifying the resultant product with an unsaturated alcohol such as allyl alcohol. Other cross-linking agents may advantageously be employed; for example reaction products of hexachlorocyclopentadiene with isoprene or butadiene retaining a reactive unsaturated linkage can be used as cross-linking agents directly without further reaction.

The proportion of olefinic cross-linking agent to unsaturated polyester can be varied within the ultimate limit of each without departing from the scope of the invention, to produce an infusible, insoluble, polyester resin. In general, the concentration of the unsaturated polyester in the olefinic cross-linking agent can vary between about ten and ninety percent. Polymerization catalysts are preferably added to the mixture of unsaturated polyester and olefinic cross-linking agent to effect setting or curing. Catalysts such as benzoyl peroxide, acetyl peroxide, lauryl peroxide, methylethyl ketone peroxide, cumene hydroperoxide and the like are satisfactory. Such catalysts are used in proportions of 0.01 to ten percent of the total resin. The polymerization reaction can also be hastened by adding promoters such as metals or metal salts, cobalt resinates, cobalt maleate, cobalt naphthenate and the like, or amines such as dibutylamine, or mercaptans such as dodecyl mercaptan. These are used in proportions similar or smaller to that stated for the catalysts.

Various reinforcing media, fillers and/or light stabilizers are preferably employed with the unsaturated polyester resin of the invention. The following are examples of suitable reinforcing media that can be used with the polymers of the invention: glass fibers, glass mats, glass cloth, synthetic fibers such as orlon, mineral fibers such as asbestos, natural fibers such as cotton, silk and wool, and metallic fibers such as aluminum and steel. Following are examples of fillers that can be used in the polymers of the invention: inorganic materials such as calcium carbonate, clay and pigments, and organic materials such as wood flour, cotton and rayon flock, sisal fibers and dyes. Many types of compounds can be used as light stabilizers. Preferred are the 2-hydroxybenophenones. Novel compounds of the type disclosed in copending application Ser. No. 829,503, filed July 27, 1959, now U.S. Patent 3,094,506.

It is also contemplated that the polyester resin skins of the invention can be coated with a light stable polymeric coating which is applied by spraying or brushing as disclosed in U.S. Patent 3,006,887, or which is applied by a coating technique as disclosed in U.S. Patent 3,051,585.

PRODUCING THE SANDWICH STRUCTURE

In one embodiment of the procedure of the invention the prefoam is deposited onto the bottom skin of the sandwich which is then set above the prefoam. As noted, the bottom skin is held on a rigid platen. A similar platen is mounted above the top skin. Heat is applied either directly to the platens or indirectly by convected hot air, thus causing the prefoam to expand and cure into a rigid, lightweight, fire-resistant foam. Expansion at the edges of the structure is limited by a restraining surface. The foam is thus completely contained during the expansion process. The internal pressure of the expanding prefoam forces the skins and foam into the controlled dimensions of the structure while the foam is curing and forming a strong adhesive bond to the skins. The result is a lightweight fire-resistant sandwich structure of controlled dimensions requiring no additional fabricating. This procedure can be applied to the continuous production of such a sandwich structure in suitably adapted equipment.

In another embodiment, skins of the desired dimensions are mounted vertically against the sides of a mold which has the thickness of the desired sandwich structure. The mold and skin can be preheated in an oven, if desired. Then the prefoam is deposited in the bottom of the mold, the foam rises to fill the mold, and the foam is cured in the oven, if desired. Subsequently, the cured sandwich structure is removed from the mold, and found to have a very strong bond between the foam and the skins, without the use of an extraneous adhesive.

It is also within the scope of the invention to produce the sandwich structures in continuous equipment. In this embodiment, the prefoam mixture is conveyed from a suitable mixing chamber through a discharge line to a discharge nozzle which is mounted on a conveyor arm. The nozzle travels back and forth transverse to a continuous sheet of the material which will subsequently form one of the outer skins of the sandwich structure. As the prefoam discharges, it flows out onto the lower skin to form a continuous layer. Simultaneously, the upper skin is laid down to form a thin sandwich structure. As the prefoam discharges, it flows out onto the lower skin to form a continuous layer. Simultaneously, the upper skin is laid down to form a thin sandwich structure comprising the two sheets and the prefoam. Paper retainer sheets are folded over the edges to contain the prefoam. The prefoam sandwich structure is conveyed on a belt from the deposition zone to the foaming zone. To effect and complete foaming, heat is applied. This heat may be supplied either by dielectric heating as described in copending application Ser. No. 779,275, for "Preparation of Polyurethane Foams by Dielectric Heating," filed December 10, 1958, or by a combination of conductive and convective heating. The upper and lower surfaces of the sandwich are retained between rigid platens, which may be suitably heated for temperature control. The formed sandwich is conveyed continuously from the foaming zone to the curing zone. The desired temperature is maintained by suitably heated rigid platens. The cured sandwich structure passes through cooled platens before discharge to a cutting knife. As it discharges, it is cut into finished sections to produce the finished structure of the desired dimensions.

The following examples serve to further illustrate the present invention and the improvements resulting therefrom.

Example 1

A combined-chlorine alkyd resin was prepared in the following manner: a five-liter, three-necked flask equipped with an agitator, a thermometer and a nitrogen inlet tube leading into the reaction mixture was immersed in an oil bath. A ten-inch column packed with glass helices was installed in one neck of the flask and connected to a water-cooled condenser. Then 699.9 grams of glycerol were placed in the reactor and the agitator started. After preheating the glycerol to 100 degrees centigrade, nitrogen was passed through the reactor at a rate of 0.01 to 0.02 cubic foot per minute. The 1555.5 grams of 1,4,5,6,7,7 - hexachlorobicyclo - (2.2.1) - 5-heptene-2,3-dicarboxylic acid (chlorendic acid), and 292.3 grams of adipic acid were charged into the reaction flask. Heating and stirring were continued and the temperature of the reaction mixture was gradually raised to 158 to 160 degrees centigrade over a period of 1 to 1¼ hours. After maintaining the reaction for an additional 1¼ hours at 158 to 160 degrees centigrade, the nitrogen flow was increased to 0.03 cubic foot per minute. These conditions were maintained at 158 to 160 degrees centigrade for 5 hours, and then the nitrogen flow was increased to 0.05 cubic foot per minute for an additional 8½ hours. At the end of this time the acid number of the resin was 16. In order to lower the acid number, a vacuum of 100 to 200 millimeters was applied at the reaction temperature of 158 to 160 degrees centigrade for 3½ hours. The resulting amber-colored resin solidified when poured into a large flat pan, and was allowed to cool to room temperature. The resin had an acid number of 5.6, a water content of 0.079 percent, and a density of 1.5 grams per cubic centimeter.

The following example describes the preparation of a protective skin in accordance with that aspect of the invention wherein carboxylic adducts of hexahalocyclopentadiene are used to prepare the polyester resin.

*Example 2*

Into a suitable reaction vessel were charged 11.1 parts of ethylene glycol, 2.7 parts of diethylene glycol, 47.5 parts of chlorendic acid, 9.6 parts of fumaric acid, and 0.009 part toluhydroquinone. The esterification was carried out at 160 degrees centigrade under an inert atmosphere of carbon dioxide until an acid number of about 25 was reached. To 500 parts of the unsaturated, polymerizable resin were added 240 parts of styrene, 7 parts of a 2-hydroxybenzophenone light stabilizer, and one percent of benzoyl peroxide based on the weight of the mixture. The resin syrup was used to impregnate a sheet of fiberglass cloth, and the impregnated cloth was placed in a press and heated at 80 degrees centigrade for ten minutes, followed by additional ten minutes at 120 degrees centigrade, to produce the reinforced polyester resin skin. The thickness of the protective skin was readily varied by pressing together several impregnated glass cloths to form a laminate of the desired thickness.

*Example 3*

Nine hundred and sixty grams of the alkyd produced in Example 1 were metered at 120 degrees centigrade through a gear pump into a mixer together with 471 grams of toluene diisocyanate and a catalyst solution consisting of 89 cubic centimeters of tertiary amyl alcohol and approximately 2.0 cubic centimeters of concentrated sulfuric acid. The components were metered to the mixer at a rate of 212 grams per minute of alkyd, 104 grams per minute of toluene diisocyanate, 20.0 cubic centimeters per minute of a catalyst solution prepared from 28.8 cubic centimeters of concentrated sulfuric acid, and 1000 cubic centimeters of tertiary amyl alcohol, to give a total prefoam rate of about 332 grams per minute. The mixer was operated at 2400 revolutions per minute to give a creamy prefoam. This prefoam was spread evenly onto the bottom of a mold 23 x 32 x 3 inches with a polyester laminate skin as prepared in Example 2 on the 23 x 32 face. The mold was composed of two 36 x 24 x ¼ inch aluminum culls and an aluminum channel frame with the inside dimensions given above. After 1500 grams of prefoam had been spread in the mold, a polyester laminate top skin was firmly pressed on the prefoam, care being taken not to trap any air bubbles under the skin. The mold was then tightly clamped together and cured at 120 degrees centigrade for one hour. The foam sandwich core had a density of approximately 2.5 pounds per cubic foot. The result was a lightweight fire-resistant sandwich structure requiring no additional fabrication and which possessed a strong adhesive bond between the core and the skin.

Examples 1, 2 and 3 demonstrate the utility of adducts of hexahalocyclopentadiene and unsaturated polycarboxylic compounds in making the core structures and skins of the sandwich structures of this invention.

By mixing and foaming in a similar manner the resin produced in the following example, which resin is based upon an adduct of hexahalocyclopentadiene and an unsaturated polyhydric alcohol, with tolylene diisocyanate and a foaming agent, a sandwich structure having similar properties can be prepared.

*Example 4*

2,3 - dimethylol - 1,4,5,6,7,7 - hexachlorobicyclo-(2.2.)-5-heptene was prepared as follows: a three-necked flask was fitted with a stirrer, thermometer, dropping funnel, moisture trap (Barrett receiver) and a condenser. Toluene was added to a stirred refluxing solution of 80 milliliters of toluene, 546 grams of hexachlorocyclopentadiene (two moles) and three milliliters of epichlorohydrin until a reflux temperature of 155 degrees centigrade was achieved. The total volume of toluene required will be about 100 milliliters. After the moisture that was present in the reagents had been removed by azeotropic distillation, 88 grams of cis-2-butenediol-1,4-(one mole) was continuously added over a four-hour period. Stirring and refluxing was maintained for four additional hours. Water, 0.2 to 2.0 milliliters, was constantly removed at the moisture trap. If the moisture is not removed the reflux temperature of the mixture will be depressed. In addition, there is less tendency for foam formation when water is removed as formed. After the total reaction time of 8 hours had elapsed, the mixture was cooled to approximately 25 degrees centigrade and filtered. The filter cake was thoroughly washed with 300 milliliters of toluene. The product weighed approximately 308 grams (approximately 85 percent yield).

One-half mole (182.5 grams) of the adduct thus prepared, 92 grams (one mole) of glycerol and 162 grams of phthalic anhydride were placed in a one-liter, three-necked flask, 100 milliliters of toluene were added and the mixture heated to a temperature of about 150 to 160 degrees centigrade for a period of about 12 hours. During this time water was continuously removed azeotropically in a Dean-Stark trap. After 12 hours the toluene was removed by vacuum distillation.

Also by mixing and foaming in the manner of Example 3, a resin based upon an adduct of hexahalocyclopentadiene and an unsaturated monocarboxylic compound, with tolylene diisocyanate, and a foaming agent, a sandwich structure having similar properties can also be prepared. The following example demonstrates the preparation of such a resin.

*Example 5*

Thirty-three and eight-tenths grams of dimer acid (dimer acid is chiefly a $C_{36}$ dibasic acid produced by the polymerization of unsaturated fatty acids. It is produced by Emery Industries Incorporated as Empol 1022 and by Wilson-Martin Company as Wilmar Dioleic 150.) and 40.7 grams of pentaerythritol were charged into a 250 milliliter three-necked flask fitted with a stirrer, condenser and gas disperser. The temperature was raised to 160 degrees centigrade and held for one-half hour. A slow stream of nitrogen was introduced and the temperature was raised to 230 degrees centigrade. This temperature was maintained until 90 percent of the calculated water was driven off. The temperature was lowered to 160 degrees centigrade and 150 grams of 1,4,5,6,7,7 - hexachlorobicyclo - (2.2.1) - 5 - heptene - 2-carboxylic acid (adduct of hexachlorocyclopentadiene and acrylic acid) was added. The temperature was held at 160 degrees centigrade and a slow stream of nitrogen was passed through the solution. At an acid number of 15, 10 grams of polyglycerol W (which is a polyetherification product of glycerol manufactured by the Colgate-Palmolive-Peet Company) was added to clarify the melt and the process was stopped.

Furthermore, by mixing and foaming in accordance with the foregoing procedures, another resin based on an adduct of hexahalocyclopentadiene and an unsaturated compound, with a crude commercial mixture of tolylene diisocyanates, and a foaming agent, an excellent sandwich structure can also be prepared. The following example demonstrates the preparation of such a resin.

*Example 6*

12 moles of trimethylolpropane and 6 moles of 1,4,5,6, 7,7 - hexachlorobicyclo - (2.2.1) - 5 - heptene - 2,3 - dicarboxylic acid were reacted until an acid number of about 25 was achieved. Then gaseous propylene oxide was introduced into the reaction mixture in a nitrogen carrier gas until the acid number was reduced to less than 1. Consumption of propylene oxide was about 4 moles. The hydroxyl number of the product was 366.

The following example shows the preparation of a protective skin of the invention using an alcohol adduct of hexahalocyclopentadiene.

Example 7

Twenty-five parts of maleic anhydride and 90 parts of 2,3 - dimethylol - 1,4,5,6,7,7 - hexachlorobicyclo - (2.2.1)-5-heptene were charged into a reaction vessel, then blanketed with an inert atmosphere, agitated and heated to 160 degrees centigrade for 16 hours. A resin having an acid number of about 40 was obtained. This resin was compounded with 30 parts of styrene and 0.03 part hydroquinone per 100 parts of resin. This mixture was catalyzed with one percent of its weight of benzoyl peroxide and employed to make a protective skin in the manner described in Example 2.

In the following Examples 8 through 11, the impact resistance of a sandwich structure prepared in accordance with the invention was compared with sandwiches made using other skin materials. In all these tests, the polyurethane foams and sandwich structures were prepared as described in Examples 1 and 3 and the sandwich structures were two inches thick. In Example 8, the sandwich structure was made with a 0.080 inch thick glass cloth laminate impregnated with a chlorendic acid based polyester resin as disclosed in Example 2. In Examples 9, 10 and 11, the sandwich structures were prepared using skins of ¼ inch plywood, ¼ inch Masonite, and ¼ inch Transite, respectively. The panels were supported in the horizontal position, and a steel ball was dropped on the panels. The height from which the ball was dropped was increased in successive drops, and the height of the drop which caused the first noticeable indentation of the polyester resin skin was observed. The forces calculated in foot-pounds, required to indent the skins were as follows:

| Example No. | Protective Skin | Force Required to Indent Surface (Foot-Pounds) |
|---|---|---|
| 8 | 80 mils Chlorendic Acid-Based Polyester | >29 |
| 9 | ¼″ Plywood | 0.88 |
| 10 | ¼″ Masonite | 9 |
| 11 | ¼″ Transite | 11 |

The impact resistance of the sandwich structure made in accordance with the invention was much superior to those produced with other types of skins of considerably greater thickness.

In the following Examples 12 through 15, the impact resistance of a sandwich structure prepared using a styrofoam core was compared with the impact strength of a sandwich structure of the invention having the same skin thickness. Results using sandwich structures of the invention having greater skin thickness were also determined. In all tests, the skins were prepared from chlorendic acid based polyester resins in the manner described in Example 2. In Examples 12 and 13, the skin thickness was 32 mils; in Examples 14 and 15 the thickness was 50 mils and 60–66 mils, respectively. In Examples 13, 14 and 15, the polyurethane foam was prepared in the manner described in Example 3, and they were tested for impact resistance in the manner described in Examples 8 through 11. The forces, calculated in foot-pounds, required to indent the skins were as follows:

| Example No. | Thickness of Polyester Protective Skin, Mils | Core Material | Force Required to Indent Surface Foot-Pounds |
|---|---|---|---|
| 12 | 32 | Styrofoam | <0.15 |
| 13 | 32 | Chlorendic Acid-Based Polyester Foam | 1.6 |
| 14 | 50 | do | 3.1 |
| 15 | 60–66 | do | >22.4 |

These results show that a sandwich structure prepared using styrofoam was far inferior to a sandwich structure of the invention which had a comparable skin thickness. The strengths of the sandwich structures of the invention being dramatically increased by reasonable increases in the skin thickness.

In a foamed in place sandwich structure without any adhesive precoat, the adhesion of the skin to the core material approximates the tensile strength of the foam itself and in many cases the fracture occurring in a tensile test takes place within the body of the core material rather than at the interface of the core material. This is illustrated by the following table:

| Density (lbs. per cu. ft.) | Adhesive Strength p.s.i. | Tensile Strength, p.s.i. | Ratio of Adhesive Strength to Tensile Strength, percent |
|---|---|---|---|
| 2.5 | 16.5 | 21.0 | 80 |
| 16.7 | 330–435 | 350–450 | 95–100 |

Although this invention has been illustrated by citing specific details of given species embraced within the scope of the invention, it is to be understood that various modifications within the spirit and scope of the invention are possible.

What is claimed is:

1. The fire-resistant, sandwich structure which comprises two protective skins in spaced-apart relationship and contained between said skins and adhering directly to the inner surfaces thereof, a polyurethane foam having reacted therein an adduct of hexahalocyclopentadiene and a dienophile having a plurality of functional groups capable of esterification, where the halogen is selected from the group consisting of fluorine, chlorine, and bromine and mixtures thereof; at least one of said skins comprising a thermoset polyester resin having reacted therein an adduct of hexahalocyclopentadiene and a dienophile having a plurality of functional groups capable of esterification, wherein the halogen is selected from the group consisting of fluorine, chlorine, bromine and mixtures thereof.

2. The fire-resistant sandwich structure of claim 1 wherein the polyurethane foam comprises the reaction product of: (A) a polyester resin comprised of (1) an adduct of hexahalocyclopentadiene and a polycarboxylic compound containing aliphatic carbon-to-carbon unsaturation, and (2) a polyhydric alcohol containing at least three hydroxyl groups; (B) an organic polyisocyanate; and (C) a foaming agent.

3. The fire-resistant sandwich structure of claim 2 wherein the adduct of hexahalocyclopentadiene and a polycarboxylic compound is 1,4,5,6,7,7-hexachlorobicyclo-(2.2.1)-5-heptene-2,3-dicarboxylic acid.

4. The fire-resistant sandwich structure of claim 2 wherein the polyester resin is produced by reacting a monomeric monoepoxide with the reaction product of an adduct of hexahalocyclopentadiene and a polycarboxylic compound containing aliphatic carbon-to-carbon unsaturation, and a polyhydric alcohol containing at least three hydroxyl groups, which has an acid number in the range of 20 to 90; to produce a product having an acid number of less than 20.

5. The fire-resistant sandwich structure of claim 4 wherein the adduct of hexahalocyclopentadiene is 1,4,5,6,7,7 - hexachlorocyclobicyclo - (2.2.1) - 5 - heptene - 2,3-dicarboxylic acid.

6. The fire-resistant sandwich structure of claim 1 wherein the polyurethane foam comprises the reaction product of (A) a polyester resin comprised of (1) an adduct of hexahalocyclopentadiene and a polyhydric alcohol containing aliphatic carbon-to-carbon unsaturation, (2) a polycarboxylic compound, and (3) a polyhydric alcohol containing at least three hydroxyl groups; (B) an organic polyisocyanate; and (C) a foaming agent.

7. The fire-resistant sandwich structure of claim 6 wherein the adduct of hexahalocyclopentadiene and a polyhydric alcohol is 2,3-dimethylol-1,4,5,6,7,7-hexachlorobicyclo-(2.2.1)-5-heptene.

8. The fire-resistant sandwich structure of claim 1 wherein the polyurethane foam comprises the reaction product of (A) a polyester resin comprised of the reaction product of (1) an adduct of hexahalocyclopentadiene and a monocarboxylic compound containing aliphatic carbon-to-carbon unsaturation, (2) a polyhydric alcohol containing at least three hydroxyl groups, and (3) a polycarboxylic compound; (B) an organic polyisocyanate; and (C) a foaming agent.

9. The fire-resistant sandwich structure of claim 8 wherein said adduct of hexahalocyclopentadiene is 1,4,5,6,7,7 - hexachlorobicyclo - (2.2.1) - 5 - heptene - 2 - carboxylic acid.

10. The fire-resistant sandwich structure of claim 1 wherein the thermoset polyester resin comprises the reaction product of (D) an unsaturated polyester resin comprised of the reaction product of (1) an adduct of hexahalocyclopentadiene and a polycarboxylic compound containing aliphatic carbon-to-carbon unsaturation, (2) a polycarboxylic compound containing aliphatic carbon-to-carbon unsaturation, and (3) a polyhydric alcohol, and (E) a vinylidene monomer.

11. The fire-resistant sandwich structure of claim 10 wherein the adduct of hexahalocyclopentadiene and a polycarboxylic compound is 1,4,5,6,7,7-hexachlorobicyclo-(2.2.1)-5-heptene-2,3-dicarboxylic acid.

12. The fire-resistant sandwich structure of claim 1 wherein the thermoset polyester resin comprises the reaction product of (D) an unsaturated polyester resin comprised of the reaction product of (1) an adduct of hexahalocyclopentadiene and a polyhydric alcohol containing aliphatic carbon-to-carbon unsaturation, and (2) a polycarboxylic compound containing carbon-to-carbon unsaturation, and (E) a vinylidene monomer.

13. The fire-resistant sandwich structure of claim 12 wherein the adduct of hexahalocyclopentadiene and a polyhydric alcohol is 2,3-dimethylol-1,4,5,6,7,7-hexachlorobicyclo-(2.2.1)-5-heptene.

References Cited by the Examiner
UNITED STATES PATENTS

| | | | |
|---|---|---|---|
| 2,740,743 | 4/56 | Pace. | |
| 2,865,869 | 12/58 | Hindersinn et al. | 260—2.5 |
| 2,994,110 | 8/61 | Hardy. | |
| 3,058,924 | 10/62 | Robitschek | 260—2.5 |
| 3,058,925 | 10/62 | Robitschek | 260—2.5 |

EARL M. BERGERT, *Primary Examiner.*

MORRIS SUSSMAN, *Examiner.*